United States Patent
Yajima

(10) Patent No.: US 8,392,656 B2
(45) Date of Patent: Mar. 5, 2013

(54) PARAMETER COPYING METHOD AND PARAMETER COPYING DEVICE

(75) Inventor: Hideharu Yajima, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 258 days.

(21) Appl. No.: 12/696,704

(22) Filed: Jan. 29, 2010

(65) Prior Publication Data

US 2010/0199049 A1    Aug. 5, 2010

(30) Foreign Application Priority Data

Feb. 4, 2009   (JP) .................................. 2009-023413

(51) Int. Cl.
  *G06F 12/00*  (2006.01)
  *G06F 12/08*  (2006.01)
  *G06F 12/16*  (2006.01)
(52) U.S. Cl. . 711/118; 711/141; 711/162; 711/E12.001; 711/E12.026
(58) Field of Classification Search .................. 711/118, 711/141, 162, E12.001, E12.026
See application file for complete search history.

(56) References Cited

U.S. PATENT DOCUMENTS 5,123,099 A  *  6/1992  Shibata et al. ................ 711/120
5,588,110 A     12/1996  DeKoning et al.
6,279,078 B1    8/2001  Sicola et al.

FOREIGN PATENT DOCUMENTS

EP    0299511 A2    1/1989
JP    2006-146320 A    6/2006

OTHER PUBLICATIONS

European Search Report dated May 26, 2010, issued in corresponding European Patent Application No. 10152461.9.

* cited by examiner

*Primary Examiner* — Yong Choe
(74) *Attorney, Agent, or Firm* — Westerman, Hattori, Daniels & Adrian, LLP

(57) ABSTRACT

A parameter copying method is applied to a duplex system in which MPU and a main memory are duplicated and duplex operations on a hot standby system are performed. The parameter copying method includes cache reading data in the main memory corresponding to one MPU, cache writing the data read in the cache reading step on an as-is basis, and writing the data into the main memory corresponding to the one MPU by a block write that is produced by a cache replace caused due to the cache writing step, and also writing the same data into the main memory corresponding to the other MPU by the block write on a basis of a mirrored write.

9 Claims, 3 Drawing Sheets

PARAMETER COPYING METHOD AND PARAMETER COPYING DEVICE

TECHNICAL FIELD

The present disclosure relates to a parameter copying method and a parameter copying device, which are applied to a duplex system in which MPU (Micro Processing Unit) and a main memory are duplicated and duplex operations on the hot standby system are performed.

RELATED ART

In the controller of the field control system or the safety instrument system, in some cases the duplex operations on the hot standby system are performed to improve reliability of the operation. The hot standby system denotes the system in which the same process is executed in parallel by two sheets of CPU cards that are prepared on the control side and the standby side respectively. In order to execute the same process, it is needed that main memory images on the control side and the standby side should coincide with each other. Therefore, in starting the duplex operations, the process of copying into the main memory image (data) on the control side into the main memory image on the standby side is executed in order to cause the main memory images on both sides to coincide with each other. Such process is called "All Parameter Copy (APC)".

[Patent Literature 1] JP-A-2006-146320

APC can be executed by using two functions described as follows.
(1) Data Equivalencing Function This data equivalencing function denotes the function of performing the copy of the parameter when MPU on the control side non-cache reads the main memory on the control side and then non-cache writes the read contents into the main memory on the standby side in compliance with the software. This function copies the parameters bit by bit at free moments while executing the controlled operation. All necessary information on the main memory on the control side are copied on the main memory on the standby side by this function.
(2) Mirrored Writing Function This mirrored writing function denotes the function of writing the control data into the main memory on the control side and also writing simultaneously the control data into the main memory on the standby side by the hardware when MPU on the control side updates the control data in accordance with the software. This function is performed in parallel with the data equivalencing function, and has a role to copy the data, which are updated by the controlled operation for the while that the copying is started by this data equivalencing function and then is ended, into the standby side.

In the existing circumstances, the process executed by this mirrored writing function imposes a heavy burden on MPU on the control side. Therefore, the copying made by the data equivalencing function per unit time must be executed bit by bit, and also a load of MPU must be suppressed by adjusting an amount of copy. As a result, it takes a long time (e.g., about 15 minute) to complete the process of APC.

However, the single operation state on the control side only is brought about during executing the process of APC. For this reason, when the fatal abnormality is caused such that MPU is stopped on the control side during the process of APC, the controller is stopped and the controlled operation cannot be continued. Accordingly, it is desired that, in order to raise an operating rate of the system, a time required for APC should be reduced as small as possible.

SUMMARY

Exemplary embodiments of the present invention provide a parameter copying method and a parameter copying device, which are capable of reducing a process time in APC.

A parameter copying method applied to a duplex system in which MPU and a main memory are duplicated and duplex operations on a hot standby system are performed, according to an exemplary embodiment of the invention, includes steps of:

cache reading data in the main memory corresponding to one MPU;

cache writing the data read in the cache reading step on an as-is basis; and writing the data into the main memory corresponding to the one MPU by a block write that is produced by a cache replace caused due to the cache writing step, and also writing the same data into the main memory corresponding to the other MPU by the block write on a basis of a mirrored write.

According to the parameter copying method, the data are written into the main memory of one MPU by the block write, and also the same data are written into the main memory of the other MPU by the block write on the basis of the mirrored write. Therefore, a process time in APC can be reduced.

The main memory corresponding to the one MPU and the main memory corresponding to the other MPU may have a cache access area and a non-cache access area in a same fashion respectively such that a cache coherency is ensured between both main memories, and the step of writing the data by the block write may be applied to the cache access areas of the main memory corresponding to the one MPU and the main memory corresponding to the other MPU.

The parameter copying method may includes a step of copying the data in the non-cache access area from the main memory corresponding to the one MPU to the main memory corresponding to the other MPU, in parallel with the step of writing the data by the block write.

A parameter copying device applied to a duplex system in which MPU and a main memory are duplicated and duplex operations on a hot standby system are performed, according to an exemplary embodiment of the invention, includes:

a section which cache reads data in the main memory corresponding one MPU;

a section which cache writes the cache read data on an as-is basis; and a section which writes the data into the main memory corresponding to the one MPU by a block write that is produced by a cache replace caused due to the cache read, and also writes the same data into the main memory corresponding to the other MPU by the block write on a basis of a mirrored write.

According to the parameter copying device, the data are written into the main memory of one MPU by the block write, and also the same data are written into the main memory of the other MPU by the block write on the basis of the mirrored write. Therefore, a process time in APC can be reduced.

According to the parameter copying method of the present invention, the data are written into the main memory of one MPU by the block write, and also the same data are written into the main memory of the other MPU by the block write on the basis of the mirrored write. Therefore, a process time in APC can be reduced.

According to the parameter copying device of the present invention, the data are written into the main memory of one MPU by the block write, and also the same data are written into the main memory of the other MPU by the block write on the basis of the mirrored write. Therefore, a process time in APC can be reduced.

Other features and advantages may be apparent from the following detailed description, the accompanying drawings and the claims.

DETAILED DESCRIPTION

An embodiment of a parameter copying method according to the present invention will be explained hereinafter.

Figure 1:
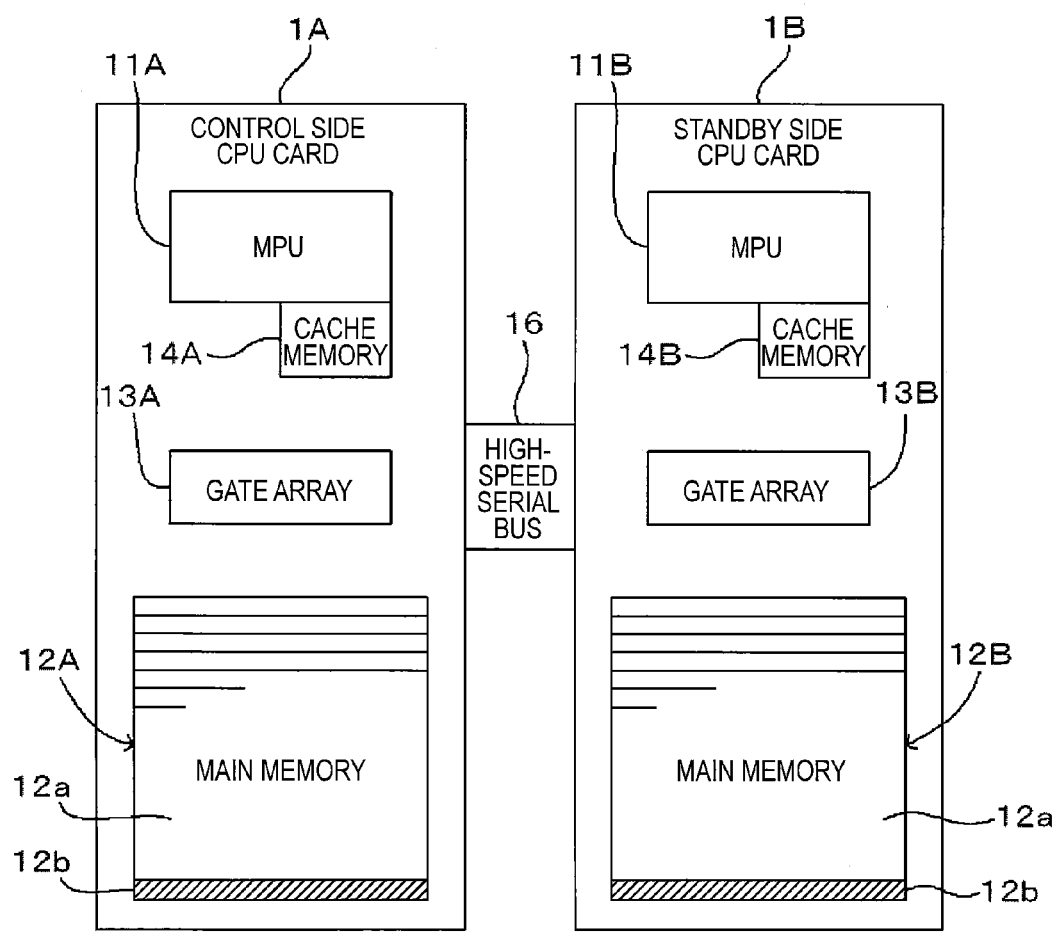
FIG. 1 is block diagram showing a configuration of a CPU card of a field controller.

FIG. 1 is block diagram showing a configuration of a CPU card of the field controller.

As shown in FIG. 1, the field controller includes a CPU card 1A on the control side and a CPU card 1B on the standby side.

A MPU 11A, a main memory 12A, and a gate array 13A are implemented in the CPU card 1A. Also, like the CPU card 1A, a MPU 11B, a main memory 12B, and a gate array 13B are implemented in the CPU card 1B.

Also, the gate array 13A of the CPU card 1A and the gate array 13B of the CPU card 1B are connected mutually by a high-speed serial bus 16.

The same process is executed in parallel in the CPU card 1A and the CPU card 1B while the duplex operations are performed by the hot standby system. Also, the data in the main memory 12A coincide with the data in the main memory 12B at this time.

Next, a process of the all parameter copy (APC) will be explained hereunder.

In the data equivalencing function in the parameter copying method of the present embodiment, a burst transfer by using the high-speed serial bus 16 is utilized. Since the burst transfer by using the high-speed serial bus 16 is performed by a block writing process from a cache memory to the main memory, a main memory area of the object must be put on the cache memory. Therefore, a division between an area in which a cache access is executed and an area in which a non-cache access is executed must be made clearly as a memory arrangement on the main memory, and a cache coherency between the main memory 12A and the main memory 12B must be kept.

For this purpose, as shown in FIG. 1, the main memory 12A and the main memory 12B are divided into a cache access area 12a and a non-cache access area 12b in the same fashion respectively. Normally, the main memory is worked effectively when such memory is utilized via the cache memory. Also, it is common that areas except the area (IO spaces) utilized by the data exchange from functions other than the MPU are accessed via the cache memory. Therefore, most of the memory areas in the main memory 12A and the main memory 12B are provided as the cache access area 12a.

Figure 2:
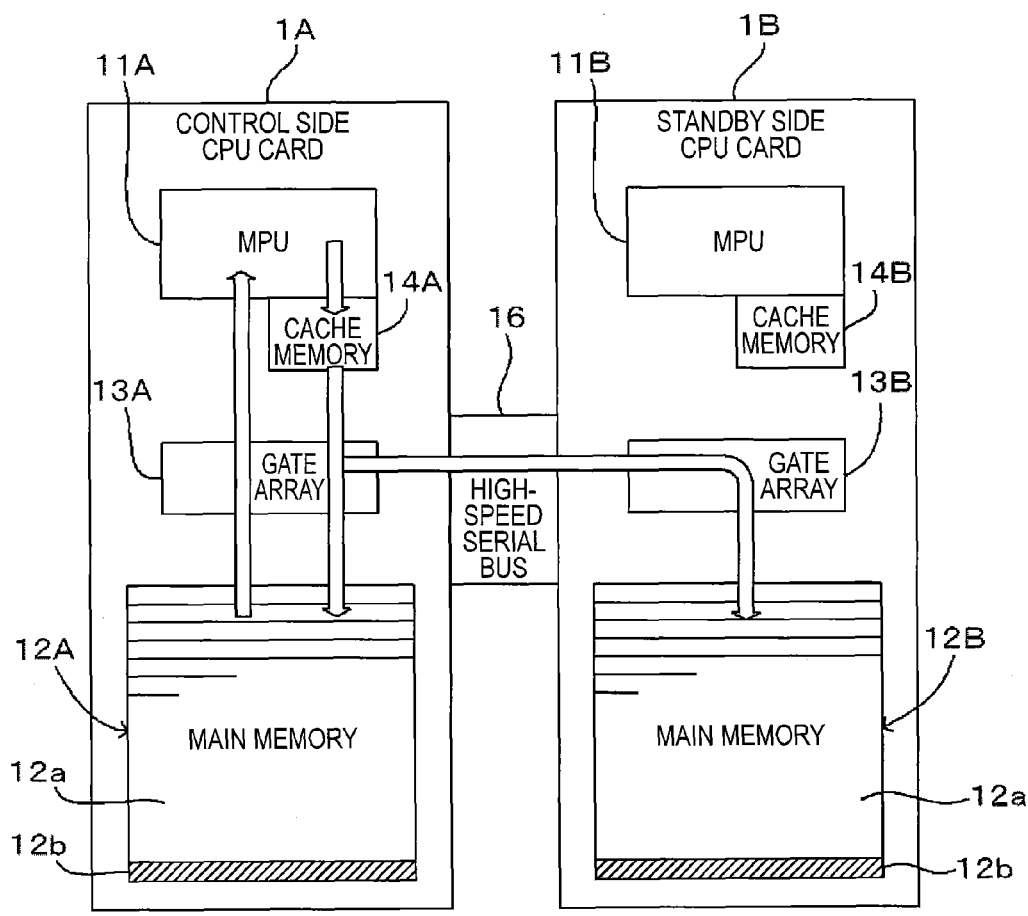
FIG. 2 is a view showing the process executed by the data equivalencing function.

FIG. 2 is a view showing the process executed by the data equivalencing function in the parameter copying method according to the present embodiment. Procedures in the process executed by the data equivalencing function will be explained hereunder.

(Step #1): The MPU 11A on the control side cache reads the data in the main memory 12A in accordance with the software. In other words, the MPU 11A on the control side reads the data in the cache access area 12a of the main memory 12A.

(Step #2): The MPU 11A cache writes the value of the read data in the cache access area 12a of the main memory 12A as it is. In other words, the MPU 11A writes the value of the read data in the cache access area 12a of the main memory 12A as it is into a cache memory 14A. As a result, although no change is made actually in the data, a state of the cache memory 14A is set to "valid" and "dirty".

(Step #3): Then, a block write into the cache access area 12a of the main memory 12A is produced by a cache replace, and simultaneously a block write into the cache access area 12a of the main memory 12B of the CPU card 1B on the standby side is made on the basis of the mirrored write via the high-speed serial bus 16.

The cache memory 14A and the cache memory 14B are managed in unit of line (e.g., data of one cache line is 32 byte). Therefore, when the cache write of the data (Step #2) is applied to one word in the cache line, the data of one line is made the object of the block write. For example, if a word is 4 Byte and data of one line is 32 Byte, a transfer capability is increased to eight times in contrast to the normal transfer in unit of word.

The process using the data equivalencing function is executed at free moments while executing the controlled operation. However, since a large amount of data can be transferred/copied by one block write, the data can be copied effectively in a short time. According to such process, all information in the cache access area 12a out of the necessary information on the main memory 12A are copied in the main memory 12B.

Figure 3:
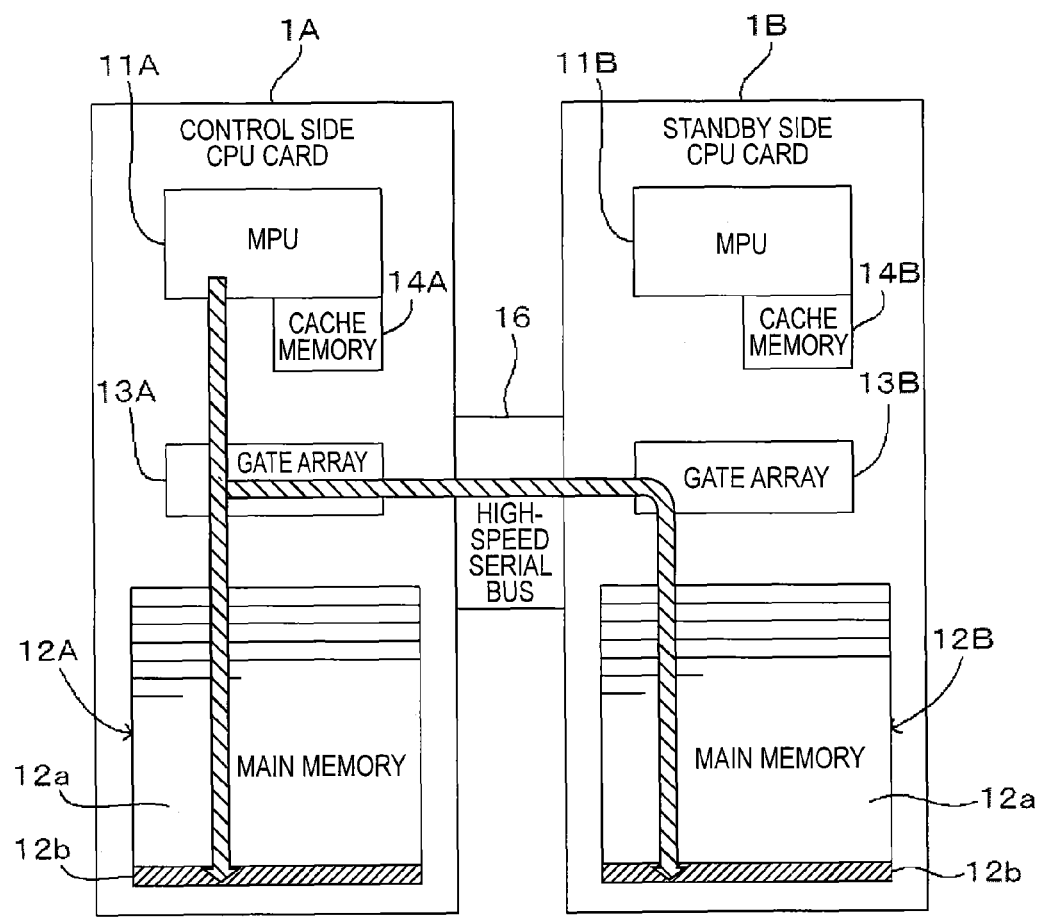
FIG. 3 is a view showing a process executed by the mirrored writing function.

FIG. 3 is a view showing a process executed by the mirrored writing function.

The mirrored writing function is the function of writing the data into the main memory 12A on the control side and simultaneously writing the data into the main memory 12B on the standby side by the hardware when the MPU 11A on the control side updates the control data in accordance with the software. This function is operated in parallel with the data equivalencing function, and has the role to copy the data, which are updated by the controlled operation for the while that the copying is started by this data equivalencing function and then is ended, into the standby side. According to the mirrored writing function, the copy of data into the non-cache access area 12b is executed.

In this manner, according to the parameter copying method of the present embodiment, when the block write is produced by the cache replace on the control side on the basis of the data equivalencing function, the burst transfer by using the high-speed serial bus 16 is executed. Therefore, a process time in APC can be reduced not to bring about an increase of the load of MPU. As a result, an operating rate of the system can be raised.

The application of the present invention is not limited to the above embodiment. The present invention is widely applied to the parameter copying method and the parameter copying device, which are applied to the duplex system in which the MPU and the main memory are duplicated and the duplex operations on the hot standby system are performed.

What is claimed is:

1. A parameter copying method for a duplex system in which a micro processing unit (MPU) and a main memory are duplicated and duplex operations of a hot standby system are performed, the duplex system having an MPU and a main memory at a control side and an MPU and a main memory at a standby side, comprising steps of:
cache reading data in a cache access area of the main memory corresponding to the MPU at the control side;
cache writing the data read in the cache reading step into a cache memory at the control side; and
writing the data into the main memory corresponding to the MPU at the control side by a block write, and also writing the same data into the main memory corresponding to the MPU at the standby side by the block write on a basis of a mirrored write;
wherein the step of writing the data by the block write is applied to the cache access area of the main memory corresponding to the MPU at the control side and to a cache access area of the main memory corresponding to the MPU at the standby side.

2. A parameter copying method according to claim 1, wherein each of the main memory corresponding to the MPU at the control side and the main memory corresponding to the MPU at the standby side have a cache access area and a non-cache access area such that a cache coherency is ensured between both main memories.

3. A parameter copying method according to claim 2, further comprising a step of:
copying the data in the non-cache access area from the main memory corresponding to the MPU at the control side to the main memory corresponding to the MPU at the standby side, in parallel with the step of writing the data by the block write.

4. A parameter copying device for a duplex system in which a micro processing unit (MPU) and a main memory are duplicated and duplex operations of a hot standby system are performed, wherein the duplex system has an MPU and a main memory at a control side and an MPU and a main memory at a standby side, comprising:
a section which cache reads data in a cache access area of the main memory corresponding to the MPU at the control side;
a section which cache writes the cache read data into a cache memory at the control side; and
a section which writes the data into the cache access area of the main memory corresponding to the MPU of the control side by a block write, and also writes the same data into a cache access area of the main memory corresponding to the MPU at the standby side by the block write on a basis of a mirrored write.

5. The parameter copying device of claim 4, wherein said sections are within a field controller.

6. The parameter copying device of claim 5, wherein said field controller includes at least one CPU card having said sections.

7. A parameter copying device for a duplex system in which a micro processing unit (MPU) and a main memory are duplicated and duplex operations of a hot standby system are performed, wherein the duplex system has an MPU and a main memory at a control side and an MPU and a main memory at a standby side, comprising:
a first controller section configured to cache read data in a cache access area of the main memory corresponding to the MPU at the control side;
a second controller section configured to cache write the cache read data into a cache memory at the control side; and
a third controller section configured to write the data into the cache access area of the main memory corresponding to the MPU of the control side by a block write, and also to write the same data into a cache access area of the main memory corresponding to the MPU at the standby side by the block write on a basis of a mirrored write.

8. The parameter copying device of claim 7, wherein said controller sections are within a field controller.

9. The parameter copying device of claim 8, wherein said field controller includes at least one CPU card having said controller sections.

* * * * *